Dec. 28, 1943.   T. B. DRESCHER   2,337,877
APPARATUS FOR INSPECTING GLASS
Filed March 7, 1942
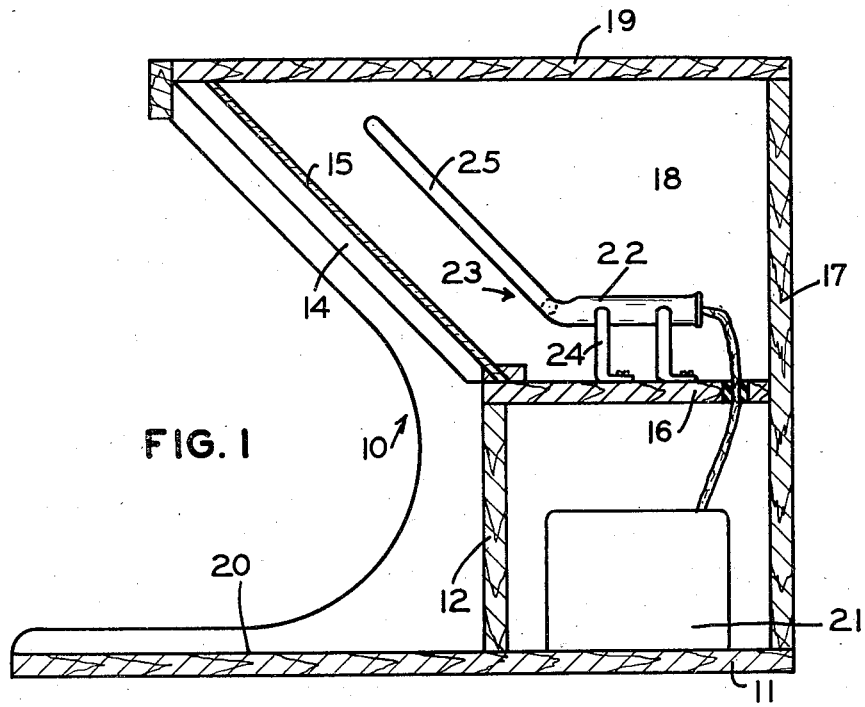
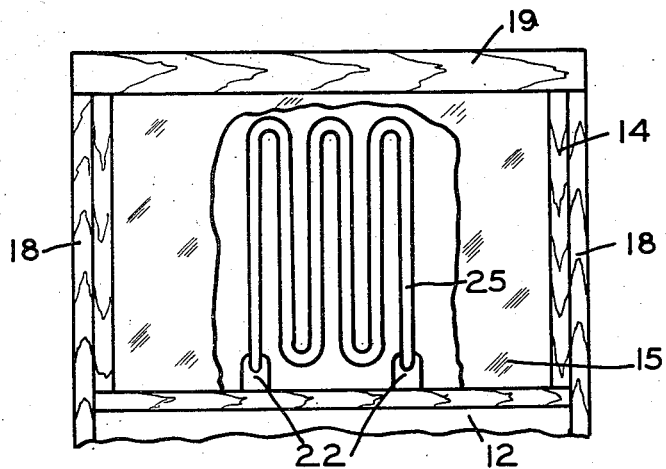
THEODORE B. DRESCHER
INVENTOR
BY
ATTORNEYS Patented Dec. 28, 1943

2,337,877

UNITED STATES PATENT OFFICE 2,337,877

APPARATUS FOR INSPECTING GLASS

Theodore B. Drescher, Rochester, N. Y., assignor to Bausch & Lomb Optical Company, Rochester, N. Y., a corporation of New York Application March 7, 1942, Serial No. 433,823

4 Claims. (Cl. 88—14)

The invention relates to apparatus for inspecting glass and particularly has reference to apparatus wherein glass is inspected with monochromatic light.

An object of the invention is to provide improved glass inspecting apparatus for testing surface curvature or configuration of a surface of a glass article and/or the thickness of such article by means of an interference pattern created by directing monochromatic light onto the article being inspected while holding such article in contact or even slightly out of contact with a standard glass article. Another object resides in providing glass inspecting means having a monochromatic light source possessing a relatively large radiating area over which the radiations of the source are substantially evenly distributed. A further object is to provide in a device for inspecting glass, a novel light source of the gaseous discharge type which is of special shape and which is adapted to be inclined to the glass undergoing inspection and to radiate substantially monochromatic light onto such glass.

These and other objects and advantages reside in certain novel features of construction, arrangement and combination of parts as will be hereinafter more fully pointed out in the appended claims.

In the drawing, wherein like reference characters indicate like parts in the different views:

Figure 1 is a sectional elevation taken longitudinally through the inspecting apparatus forming the subject matter of this invention.

Figure 2 is a fragmentary front elevation of the inspecting apparatus with parts thereof broken away to show the interior of the device.

A successful construction for carrying the invention into practical effect is detailed in the drawing wherein 10 designates a housing having a base 11 adapted to be seated on some support such as a table top. A front wall 12 extends above the base and has a frame portion 14 which provides a window in the housing. The frame portion 14 is inclined to the base 11 and has a diffusing means in the form of the ground glass plate 15 mounted therein. It is to be noted that the faces of the plate 15 also lie in planes which are inclined to the base.

A substantially horizontal partition 16, located at the edge of the frame portion 14 which is nearest the base of the housing and joined to the front wall 12, divides the housing into upper and lower compartments. Side walls 18 and a top 19, suitably joined to the other walls and the partition 16, complete the housing. Base 11 has a portion 20 which extends forwardly of the front wall 12 and provides a work support for articles undergoing inspection.

Within the lower compartment of the housing there is mounted a transformer 21 which is suitably connected to a source of electric energy and to the electrode ends 22 of the gaseous discharge lamp 23 carried within the upper compartment of the housing on insulators 24 supported on the partition 16. The discharge tube 25 of lamp 23 is given a serpentine shape which as shown in Figure 2 is in the form of a grid. The sections of the grid form a series of U-shaped waves when the grid is viewed in front elevation. Another practical shape to be given to discharge tube 25 comprehends forming the disk into a coil.

Whatever the shape of tube 25, it is to be observed that by using a serpentine form, that the radiating area for the lamp is a relatively large one and that this area is defined by a plane common to all sections of the discharge tube. In other words, the radiating area of the lamp is substantially a comparatively large plane area and can be treated as such. Since the serpentine shape of the tube allows the portions thereof to be placed closely together, it may also be observed that the radiations of the lamp will be substantially evenly distributed over the radiating area. Moreover, due to the illuminating medium, radiations of substantially even intensity can be expected along the discharge tube 25.

The grid or other serpentine shape for the tube 25 allows the lamp 23 to be readily mounted within the upper compartment of the housing 10 so that the sections of the tube will face the window and also the ground glass 15 in a manner to locate the radiating area of the lamp in substantially parallel relation to the plane of the window and the surfaces of the ground glass. As a result, the radiating area of the lamp 23 or its discharge tube will be inclined to the base 11 of the housing. It will be evident from the foregoing that when the lamp is energized, light emanating therefrom will be directed downwardly onto the work support 20 of the base of the housing.

The lamp 23 contains a suitable gas which when energized will radiate substantially monochromatic light. When two pieces of glass are placed one on the other and are viewed in monochromatic light, Newton's rings will appear at the contacting surfaces if such surfaces are not congruent. This phenomenon, as is well understood by the art, may be utilized to determine the surface curvature or configuration of a surface of a glass work piece and/or the thickness of the work piece by contacting it or nearly contacting it with a standard or known piece of glass.

To carry out inspection, lamp 23 is energized and the work piece and standard, in suitable relation to each other, are placed on or held over the work support portion 20 of the base. The inspector, who is positioned in front of the apparatus, looks downwardly onto the work piece and the standard which are illuminated by monochromatic light from lamp 23. Due to the inclination of the discharge tube 25 with respect to the base 11, radiations from the lamp 23 will be indirectly transmitted to the eyes of the inspector who is looking downwardly onto the work support 20 and not into the lamp.

The term substantially monochromatic light as used herein refers to light which is sufficiently monochromatic to cause the appearance of an interference pattern or Newton's rings between two pieces of glass when they are viewed in this light under circumstances wherein a surface on one piece of glass is in contact or in suitable close proximity with a surface on the other piece of glass, it being here mentioned that under proper conditions an interference pattern may be formed without the glass articles touching each other.

In general, most gaseous discharge lamps which produce a line spectrum may be employed for practicing the invention. Helium provides an excellent light source which causes the interference pattern to stand out strongly and allows it to be discerned with great ease. Other suitable gaseous discharge lamps include those using neon or mercury or sodium. A gaseous discharge type of lamp has been found more satisfactory for inspection purposes than other types of lamps and the use of helium in a gaseous discharge lamp is preferred to other illuminating media.

From the foregoing, it will be appreciated that the aims and objects of the invention have been attained by the novel and useful apparatus herein described. At the same time, a glass inspecting device of compact design and simple operation has been provided.

I claim:

1. In an examining device of the type described, a housing, said housing having a substantially flat base which extends beyond the top wall of said housing to provide a seat portion on which a glass article may be placed for inspection, the upper portion of the side wall of said housing adjacent the seat portion of said base extending transversely across the base and being provided with a window which lies above the base and in a plane inclined to said base; light diffusing means in said window; a partition located at the edge of said window nearest said base to provide an upper compartment in said housing; a gaseous discharge lamp within said compartment, said lamp containing gas which when energized radiates substantially monochromatic light, the lamp having a discharge tube which is in the shape of a grid of relatively large area; and means in the housing for supporting said lamp on said partition so that its grid is disposed in said compartment and lies in a plane substantially parallel to said window whereby light emanating from the lamp is directed downwardly through said window onto the seat portion of the base to illuminate an article undergoing inspection.

2. In an examining device of the type described, a casing comprising a bottom wall laterally extending beyond the one marginal edge of the top wall thereof and a side wall projecting downwardly of said top wall and inwardly of said casing to a point substantially midway of the top and bottom walls and then vertically downward to said bottom wall, the portion of said bottom wall extending laterally of said side wall forming a support for horizontally mounting an object to be examined, the inwardly projecting portion of said side wall having an opening therein; a ground glass disposed within said opening; a source of monochromatic light, said source of light comprising a grid-shaped discharge tube of relatively large area; and means for supporting said tube within said casing in a plane spaced inwardly of and substantially parallel to said ground glass whereby light emanating from said tube passes downwardly through said ground glass and is directed on the object mounted on said support, the top wall forming a screen for preventing light rays from directly reaching the eye of an observer.

3. In an examining device of the type described, a casing comprising a bottom wall laterally extending beyond the one marginal edge of the top wall thereof and a side wall projecting downwardly of said top wall and inwardly of said casing to a point substantially midway of the top and bottom walls and then vertically downward to said bottom wall, the portion of said bottom wall extending laterally of said side wall forming a support for horizontally mounting an object to be examined, the inwardly projecting portion of said side wall having an opening therein; a ground glass disposed within said casing; a source of monochromatic light, said source of light comprising a grid-shaped discharge tube of relatively large area; a transverse wall dividing said casing into upper and lower sections; and means for mounting said tube on said transverse wall to extend into said upper section in a plane spaced inwardly of and substantially parallel to said ground glass whereby light emanating from said tube passes through said ground glass and is directed on the object mounted on said support, the top wall forming a screen for preventing light rays from directly reaching the eye of an observer.

4. In an examining device of the type described, a casing comprising a bottom wall laterally extending beyond the one marginal edge of the top wall thereof and a side wall projecting downwardly of said top wall and inwardly of said casing to a point substantially midway of the top and bottom walls and then vertically downward to said bottom wall, the portion of said bottom wall extending laterally of said side wall forming a support for horizontally mounting an object to be examined, the inwardly projecting portion of said side wall having an opening therein; a ground glass disposed within said casing; a source of monochromatic light, said source of light comprising a grid-shaped discharge tube of relatively large area; a transverse wall dividing said casing into upper and lower sections; means for mounting said tube on said transverse wall to extend into said upper section in a plane spaced inwardly of and substantially parallel to said ground glass whereby light emanating from said tube passes through said ground glass and is incident on the object mounted on said support, the top wall forming a screen for preventing light rays from directly reaching the eye of an observer; and a transformer mounted in said lower section and electrically connected into the energizing circuit of said tube.

THEODORE B. DRESCHER.